United States Patent

[11] 3,596,519

| [72] | Inventors | Fred Blonder<br>West Palm Beach;<br>Theodore H. Elworth, North Palm Beach, both of, Fla. |
|---|---|---|
| [21] | Appl. No. | 870,299 |
| [22] | Filed | Jan. 21, 1970 |
| [45] | Patented | Aug. 3, 1971 |
| [73] | Assignee | Molecular Research, Inc.<br>Palm Beach, Fla.<br>Continuation of application Ser. No. 685,465, Nov. 24, 1967. |

[54] HOT SPOT DETECTOR SYSTEM
4 Claims, 8 Drawing Figs.

[52] U.S. Cl. .................................................... 73/355, 73/15
[51] Int. Cl. ....................................................... G01j 5/02, G01k 13/06
[50] Field of Search ............................................. 73/355, 340, 15, 190

[56] References Cited
UNITED STATES PATENTS

| 1,901,209 | 3/1933 | Vayda | 73/355 X |
| 2,999,152 | 9/1961 | Gallagher et al. | 73/355 X |
| 3,101,618 | 8/1963 | Hance | 73/355 X |
| 3,210,546 | 10/1965 | Perron | 73/15 UX |
| 3,401,551 | 9/1968 | Maley | 73/15 |
| 3,451,254 | 6/1969 | Maley | 73/15 |

OTHER REFERENCES

Astheimer, R. W. et al. Instrument for Thermal Photography. In the Journal of the Optical Society of America. Vol. 49, No. 2, Feb. 1959. Pp. 184– 7. Q C– 350– 06

Primary Examiner—Louis R. Prince
Assistant Examiner—Frederick Shoon

ABSTRACT: A spot detecting system for automatically measuring and recording said temperature levels of the surface of a container to anticipate breakthroughs in the lining of the container in order to properly schedule lining maintenance. The spot detecting system includes a triggering means for actuating the system, thermal radiation sensors for detecting the temperature levels of various areas of the outer surface of the container, recording means connected to the sensors for printing a temperature level profile of the container, and an alarm means connected to the system for indicating possible breakthroughs in the container.

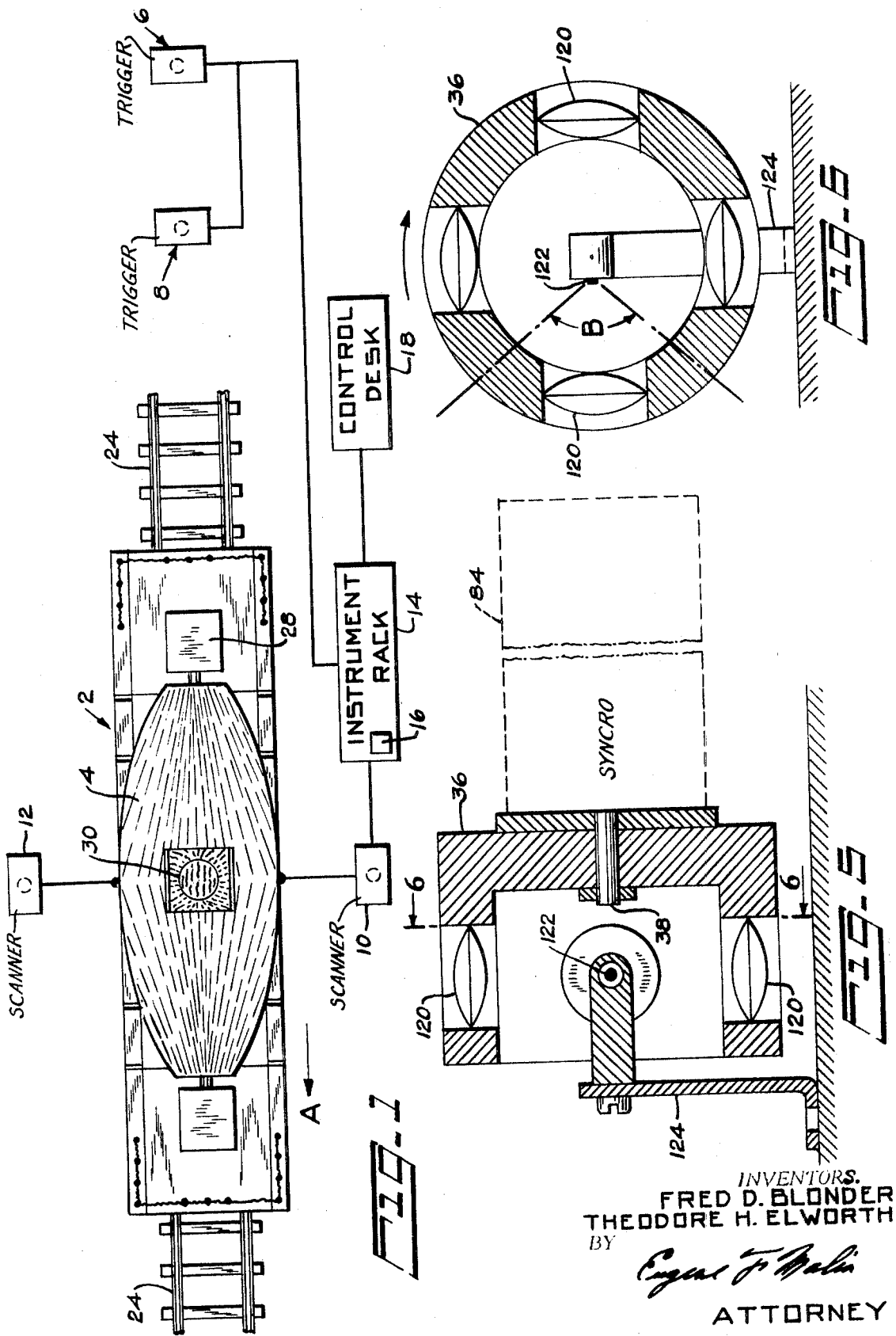

PATENTED AUG 3 1971   3,596,519

INVENTORS.
FRED D. BLONDER
THEODORE H. ELWORTH
BY
ATTORNEY

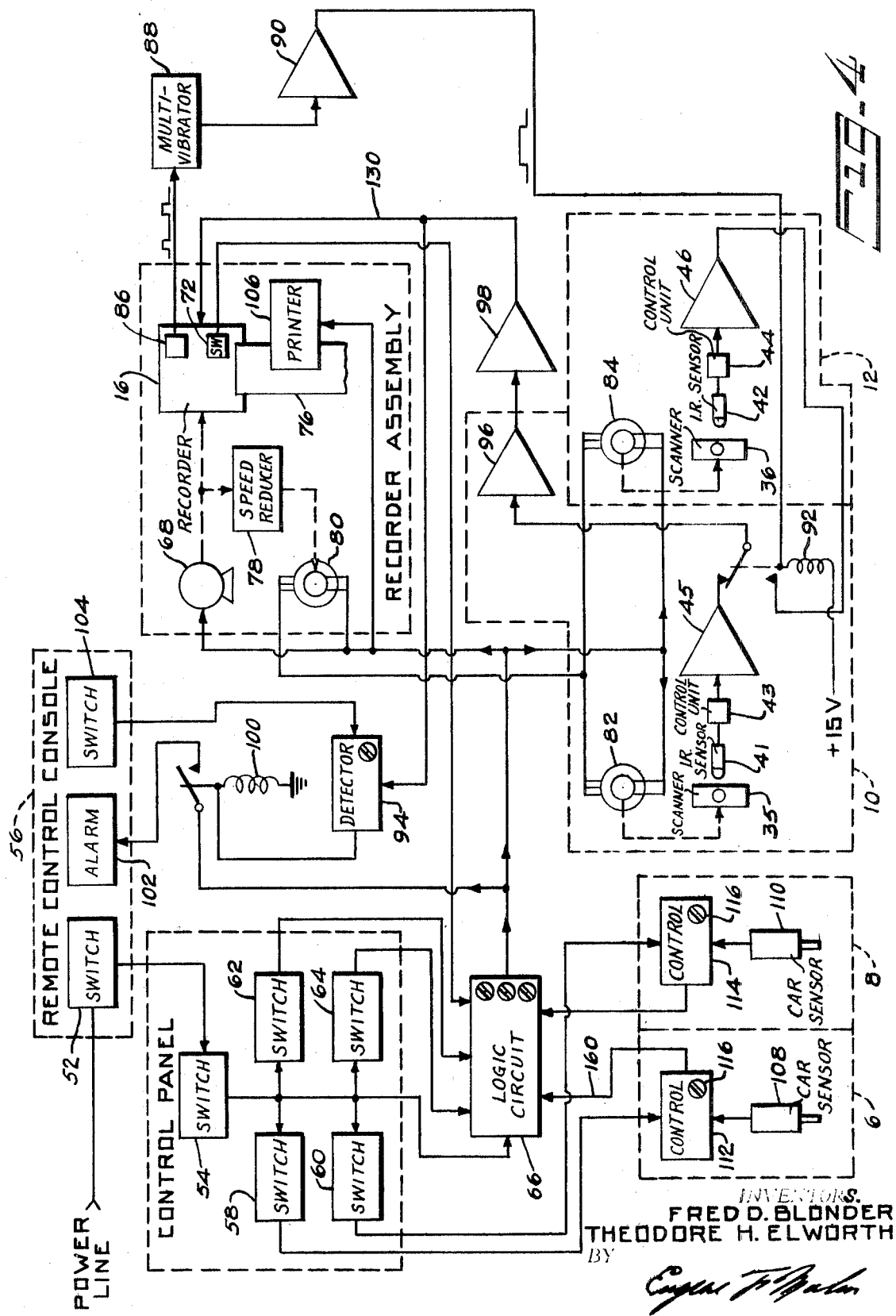

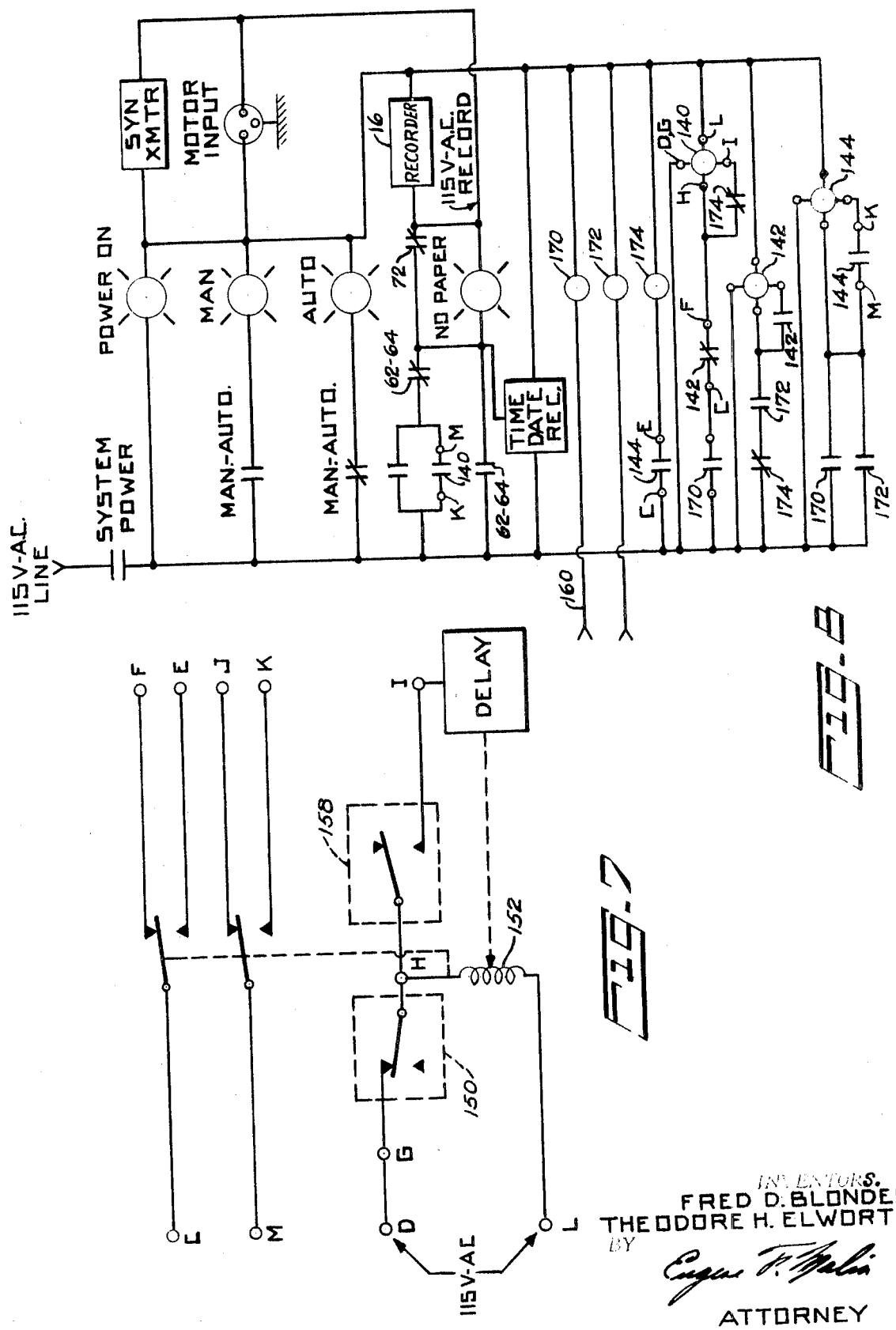

HOT SPOT DETECTOR SYSTEM

This application is a streamlined continuation of application Ser. No. 685,465, filed Nov. 24, 1967.

BACKGROUND OF THE INVENTION

This invention relates to a new hot spot detecting system, and, more particularly, to a detecting system for sensing and recording the temperature level of a container in order to anticipate possible breakthroughs in the container lining.

As is perhaps well known, when material handling containers are used repeatedly to carry either hot or cold material, the material in a container on a car may cause fissures to develop in the internal lining of the container. If such fissures are not attended to periodically they may ultimately produce a breach in the sides of the container, thereby wasting material, instituting costly removal procedures and possibly injuring personnel. If maintenance programs are initiated too frequently, unneeded maintenance costs may become prohibitive.

SUMMARY OF THE INVENTION

The present invention relates to a new spot detecting system for detecting spots of varying temperatures of the outer surface of a container caused by fissures in the lining of the container. The spot detecting system includes control means for coordinating the data retrieval system, sensing means that move relative to a container for obtaining the temperature levels of the surface of the container, and indicating means connected to the sensing means for indicating possible breakthrough conditions in the lining of the container. The indicating means includes recording means connected to the sensing means for recording the temperature level profiles of the container.

It is an object of this invention to provide a spot detecting system for determining when the lining in a container should be replaced due to fissures in the lining in order to prevent loss of material, damage to the container and other property, or injury of personnel.

It is another object of this invention to provide a temperature level profile of the surface of a particular container in order to properly schedule container lining maintenance.

A further object of this invention is to provide a spot detecting system in order to locate fissures in the lining of a container.

A further object of this invention is to provide a noncomplex spot detecting system for determining the condition of the lining in a container.

A further object of this invention is to provide a means for scanning thin areas of a container in order to provide a profile readout of the temperature levels of the surface of a container.

An additional object of this invention is to provide a spot detecting system including an audio alarm for indicating possible breakthroughs and a visual record of the variations in the temperature level of the surface of a container.

In accordance with these and other objects which will be apparent hereinafter, the instant invention will now be described with particular reference to the accompanying drawings, illustrating the spot detection system.

BRIEF DESCRIPTION OF THE DRAWINGS

In the drawings:

FIG. 1, is a planned view of one embodiment of the invention;

FIG. 4, is a block diagram of the electrical control system;

FIG. 5, is a cross-sectional view of the optical assembly;

FIG. 6, is another cross section view of the optical assembly taken along the lines 6–6 in FIG. 5 and looking in the direction of the arrows;

FIG. 7, is a functional schematic of the time delay relay;

FIG. 8, is a diagram depicting the relay logic circuitry.

DESCRIPTION OF THE PREFERRED EMBODIMENT

Figure 3:
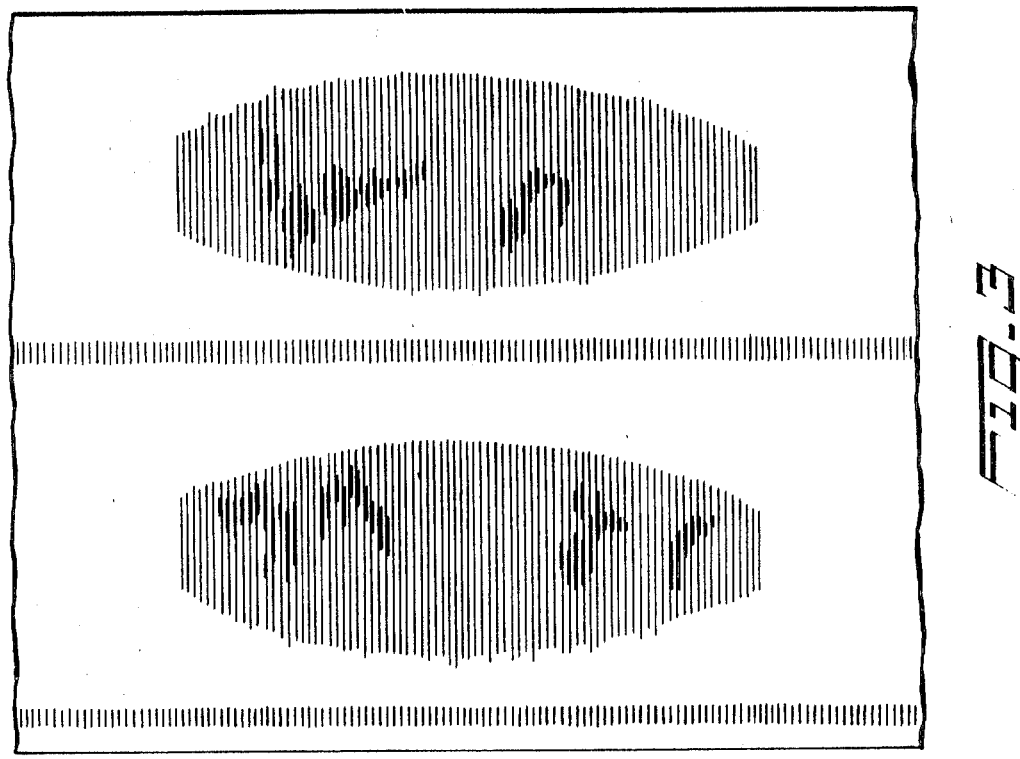
FIG. 3, is a typical profile printout from the recorder.

Referring now in detail to the drawings, wherein one embodiment of the invention is shown, and referring, particularly, to FIG. 1, the spot detecting system, illustrated in block diagram, is shown as a hot spot detecting system for automatically measuring temperature levels in various areas of the outside surface of a container, on a hot metal vehicle, generally designated as numeral 2. The spot detecting system indicates particular temperature levels in order to provide means to anticipate breaches in the sides of the vehicle 2 caused by fissures in the internal lining of the container 4. When the vehicle 2, a hot metal car, moves past the inspection zone, in a forward direction as shown by arrow A, the system scans both sides of the container 4 to provide temperature level profiles of the container 4, as shown in FIG. 3. When the hot metal car 2 initially moves into the inspection zone, as shown in FIG. 1, two subsystems 6 and 8 sense the presence and the direction of movement of the car 2 for triggering or initiating the spot detecting cycle. Thereafter, as the car 2 passes the activated scanner housings 10 and 12, infrared detecting elements in the scanner housings sense the surface temperature levels along vertical areas of the surface of the container 4. The subsystems 6 and 8 and the scanner housings 10 and 12 are connected to an instrument rack 14, containing the recording means 16. The instrument rack 14 is connected to the control desk 18, containing the control system. The spot detecting system includes a control panel having the switches and indicators required to apply line power to the system and to select the mode of operation, and a logic and control chassis. The control panel and the logic and control chassis will be described in more detail hereinafter.

Figure 2:
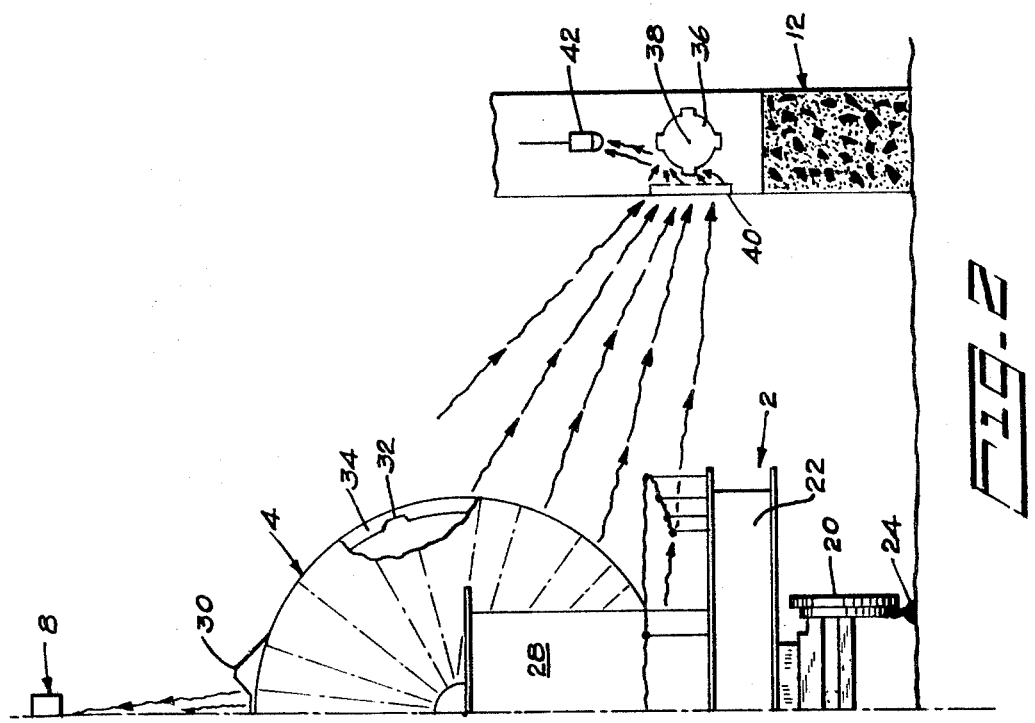
FIG. 2, is a partial front view of the embodiment shown in FIG. 1.

Referring now to FIG. 2, the wheels 20 of the hot metal car 2 are connected to the bed 22. The car 2 is moved past the inspection zone on railroad tracks 24. The container is rotatably connected to the bed 22 by a rotating mechanism enclosed in casing 28. The car 2 is loaded and unloaded through opening 30 in the top of the car by rotating the container 4.

The subsystems 6 and 8, which includes infrared sensing units, are mounted to an overhead supporting structure in such a manner as to view a given area of the railbed. Thus, when a loaded hot metal car passes beneath the subsystems, the opening 30 will actuate the infrared sensing units in the subsystems 6 and 8 to trigger the spot detecting cycle in order to actuate the sensing and scanning operation.

The scanner housings 10 and 12 are concrete block enclosures. Each housing contains means for locating hot spots on the outer surface of the container in order to locate fissures, one of which is designated by numeral 32, in the internal lining 34 of the container 4. Each scanner housing contains a synchro-driven lens assembly 36 rotated about shaft 38. The lens assembly sweeps a narrow vertical area of the hot metal car 2 as the car passes the viewing aperture 40 in order to actuate an infrared detecting element 42 that senses the surface temperature levels existing along the vertical area of the container being scanned. The lens assembly will be described in detail hereinafter.

The outputs of the detecting elements or sensors 42 are transmitted to the recorder 16 located on the instrument rack 14, in order to provide a profile printout of the temperature levels of the container surface. One such profile, shown in FIG. 3, is produced as a series of horizontal lines, which are printed side-by-side on a wide strip of sensitized paper. When hot spots are present on either side of the hot metal car 2, the hot spots will be reproduced as darkened lines within the appropriate profile outline. The recorder will also print the time and date on the profile outline in order to identify the particular car being scanned when a plurality of cars are driven past the inspection station.

Referring now to FIG. 4, a block diagram depicting the signal flow in the spot detecting system, line power (115 volt alternating current) is applied to the system control panel 50 by way of power switch 52 and 54. Power switch 52 is located on a remote control console 56 and power switch 54 is located in the control panel 50. A series configuration is employed in order to enable remote application and removal of line power when the system control panel 50 is not manned. Line power is made available to each hot metal detecting subsystem 6 and 8 by way of individual switches 58 and 60, and to the system relay logic circuitry 66 in accordance with the selected mode of operation by way of an automatic mode switch 62 or a manual mode switch 64.

Two conditions must be satisfied before the system relay logic circuitry 66 will couple the line power to the recording motor 68 and the various synchro-motor terminals in the detecting system. If either or both of these conditions have not been satisfied, the scanning and recording operations will not take place. The first condition is that the first hot metal car 2, in a train of cars, has passed by the location of the hot metal detector subsystems 6 and 8 in a forward direction as indicated by arrow A in FIG. 1. The second condition is that recording paper must be in the recorder 16, as illustrated in FIG. 4. If the recorder 16 is operated in an unloaded condition it may be damaged. Therefore a microswitch 72 is incorporated in the recording assembly to transmit a no-paper signal to the relay logic circuitry 66.

The microswitch 72 provides a paper sensing function. When recording paper is properly installed in the unit, the microswitch 72 is closed and the system relay logic circuitry 66 enables the recorder to be energized at the appropriate time. Should this switch be open due to lack of paper, the logic circuitry 66 accepts this condition as a no-paper signal and inhibits the recorder start function.

Upon receipt of the 115 volt record command, the alternating current motor 68 commences to advance the sensitized paper through the recorder, starts the line printing operation on the recording paper 76, and rotates the lens assemblies 35 and 36 in the scanner housings 10 and 12 at 450 revolutions per minute. The recording motor 68 drives speed reducer 78 which drives synchro transmitter 80 which, in turn, drives synchro receivers 82 and 84. The synchro receivers drive the lens assemblies 35 and 36.

The lens assemblies 35 and 36 direct the infrared radiation to sensors 41 and 42 respectively. The sensors 41 and 42 initiate a signal that is transmitted through control units 43 and 44 respectively to analog voltage output amplifiers 45 and 46 respectively. The conditioning amplifiers 45 and 46 may be high-gain chopper-stabilized operational amplifiers.

When the line printing mechanism of the recorder 16 reaches an index position, that is, the extreme left-hand portion of the left-hand recorded image area, as shown in FIG. 3, a recorder reed relay 86, shown in FIG. 4, initiates the first positive 12 volt direct current spike. The reed relay 86 produces a positive 12 volt spike each time that a horizontal line printout is initiated. These spikes are used to trigger a timing circuit consisting of the monostable multivibrator 88 and the relay driver 90. This circuit synchronizes the switching of the signal conditioning amplifier outputs from each scanner 10 and 12, such that the side-by-side temperature level profile display is produced. The spike triggers the monostable multivibrator 88 causing it to initiate a negative pulse of 16.5 milliseconds duration. The width of this pulse is controlled by means of an external capacitor connected to the multivibrator 88. The relay driver 90 inverts this to a ground-to-positive direct current signal and applies this pulse to one side of the coil relay 92.

At this time, the analog voltage output of amplifier 45 is applied to the recorder 16 and to the level detector 94 by way of amplifier 96 and the operational amplifier 98. The first line of printed data on the left-hand portion of the recording paper shown in FIG. 3 thus reflects the temperature levels existing along the first vertical area scanned on one side of the hot metal car.

When the 16.5 milliseconds pulse output of the relay driver 90 in FIG. 4 returns to ground potential, relay 92 is energized and the recorder accepts the analog output of amplifier 46. The first line of printed data on the right-hand portion of the recording paper thus reflects the temperature levels existing along the first vertical area scanned on the other side of the hot metal car.

Upon the return of the line printing mechanism to its index position, another positive 12 volt spike is generated, the monostable multivibrator 88 is again triggered and relay 92 deenergizes. The second line of data thus commences with a printout of the temperature readings from the initial side of the hot metal car.

The alternate recording operation continues in this fashion, as the first hot metal car passes in front of the scanner housing apertures. Should any hot spots be present on either surface of that car, the relatively high-level output of the operational amplifier 98, caused by that reading, will energize and latch relay 100 via the level detector 94. This, in turn, will apply the 115 volts, record command to an alarm indicator 102 located on the remote control console 56. A reset switch 104 on that console enables the relay latching operation to be terminated manually.

After each hot metal car in the train has passed by the scanner housing apertures, time delay relays in the system relay logic circuitry 66 come into play. These either maintain the 115 volt record command to the recorder motor 68, if another hot metal car has been sensed by the hot metal detecting subsystems 6 and 8, or terminate this command if the car just scanned is the last one in the train. Should the latter condition exist, removal of the record command will terminate the system scanning and recording operations and cause the printer 106 to stamp time and date information on the recording paper 76.

The system employs two not metal detecting subsystems 6 and 8 to initiate the scanning and recording operations during the automatic mode. The subsystems 6 and 8 detect the presence of infrared radiation from objects having temperatures of 800° F. and upward and furnishes a logic level signal for computer input to control auxiliary equipment. The subsystems 6 and 8 include sensing units 108 and 110 respectively, and control units 112 and 114 respectively. Each sensing unit includes a lens in the viewing end of the unit, and serves to focus all external radiation directly onto the sensing element. The sensing units are of rugged design which allows the units to be operated under environmental conditions of high ambient lighting, high dust content and wide temperature variations.

The control unit houses the electronics required to amplify the relatively small signal developed by the sensing unit when a heated object is brought into the latter's field of view. The control unit electronics includes a plug-in relay driver module and a triple-pole, double-throw relay, of which only one set of contacts are employed in this particular use. A sensitivity potentiometer 116 is included on each control unit chassis to allow adjustment of the threshold level at which the relay energizes.

Referring now to FIGS. 5 and 6, the scanning of each side of the hot metal car is accomplished by means of lenses 120 and infrared detecting element 122. Lens mounts 35 and 36 are cup-shaped devices each of which contains four lenses spaced equally around its circumference. The detecting element is mounted to an L-shaped bracket 124 and is located in a plane passing through the lens centers. When each lens mount 35 or 36 is rotated, each lens causes the detecting element line-of-sight to sweep through an angle B, thereby viewing a given vertical area on the container 4. The magnitude of this angle is determined by the height of the viewing aperture 40, shown in FIG. 2, that is built into the scanner housing 12.

The synchro transmitter 80 and receivers 82 and 84 rotate at a speed of 450 revolutions per minute. Since a total of four lenses are contained in the mount, however, the system scanning operation occurs at a rate of 1800 scans-per-minute.

The recorder 16 prints each horizontal line of data by means of an insulated rotating drum, a stainless steel wire helix and a straight edge electrode configuration, not shown. The wire is attached to the drum by means of a number of standoffs. These are arranged in a helical path which makes one complete revolution around the surface of the drum. The electrode spans the entire length of the drum and is located close to the surface of the wire helix.

The recording paper is fed between the surface of the wire helix and the straight edge of the electrode. The paper is a specially-prepared product which is moistened to present a resistance between these elements.

The analog signal transmitted through line 130, shown in FIG. 4, is impressed across the wire and the electrode, with the latter serving as the signal ground connection. The voltage developed across the resistance of the recording paper causes a spot to be burned onto the surface of the paper. As the drum makes one complete revolution, this spot travels across the entire width of the paper, printing a line whose intensity varies directly with the magnitude of the developed voltage.

The reed relay 86 referred to hereinabove is energized by means of a small magnet mounted to a rotating disk. This disk is attached to the recorder drive shaft which is located at the left-hand side of the assembly. These components are adjusted so that the magnet closes the relay 86 when the extreme left-hand portion of the wire helix is aligned with the straight-edge electrode.

The microswitch 72, employed to furnish the no-paper signal, is located at the base of the right-hand well which accepts the paper roll shaft. When the paper supply has been depleted, the shaft end collapses inwardly, causing the switch to open and a no-paper signal to be initiated.

The time and date printer 106 may employ a synchronous motor-driven character wheel, an inked ribbon and a solenoid-controlled stamping mechanism to print time and date information on the recording paper. This unit prints out year, month, day and time data in an alpha-numeric format.

When 115 volt power is applied to the time and date printer, the synchronous motor is energized. Rotation of the motor causes each character wheel to advance automatically in step with the date and time of day, once this data is initially set into the wheels. In order to activate the stamping mechanism, however, power must first be applied to a solenoid and then removed, in that sequence.

Now referring to the relay logic circuitry 66 that controls the application of 115 volt line power to all system units, in the automatic mode of operation, the relay logic circuitry 66 functions to apply the 115 volt record command to the recorder. The record command will be given if a printout is called for and will be inhibited if a train of hot metal cars is moved past the inspection zone in the improper direction. This is accomplished by means of three time delay relays which are designated as 140, 142, and 144, shown in FIG. 8.

Before considering how the relay logic circuitry operates, reference is made to FIG. 7 showing the internal configuration of these time delay relays. FIG. 7 is a functional schematic diagram of the time delay relay, showing a typical application in the detecting system. The relay will energize only when external contact 150 is closed, since this causes the 115 volt line power to be applied across the relay coil 152 by way of common terminals G and H. Once energized, the relay will remain in an energized state even if 115 volt power is removed, as long as external contact 158 remains open. When contact 158 is closed, however, a time delay circuitry is activated. The relay will then return to its deenergized state after the given time delay period has elapsed. Should the 115 volt power be reapplied to the relay during this delay-on-break period, the relay will immediately energize and the delay period will begin anew when power has again been removed.

In use in the automatic mode, after the line power switches are actuated, the hot metal detecting subsystem 6 detects the presence of a hot metal car, and the control unit 112 applies the line power of 115 volts to the relay logic circuitry 66 by way of line 160 causing relay 170 to momentarily energize, as shown in FIG. 8. Energization of this relay 170 causes the following events to occur virtually simultaneously:

a. Time delay relay 140 energizes, since terminals G and H are tied together via closed contacts of relay 170 and normally closed contacts C and F of relay 142.
b. The 115 volt record command is applied to the temperature profile recorder 16, assuming sufficient recording paper is available, via closed contacts K and M of relay 140 and the closed contacts of the manual-auto switch 62—64 and no-paper switch 72.
c. Time delay relay 144 energizes, since terminals G and H are tied together via closed contacts of relay 170.
d. Relay 174 energizes via closed contacts C and E of relay 144.
e. The 3-second delay-on-break function of relay 144 is initiated via its own closed contacts M and K.
f. The 10-second delay-on-break function of relay 140 is inhibited via its now open contacts of relay 174.

When the 3-second delay-on-break period for relay 144 has expired, relay 174 will deenergize via now open contacts C and E of relay 144. Deenergizing of relay 174, in turn, ties terminals H and I of relay 140 together, thereby initiating its 10-second delay-on-break period.

Should only one hot metal car comprise the train, the system will automatically return to its initial condition after the 10-second delay has run out. If more than one hot metal car is employed, however, relay 170 will again momentarily energize, causing the foregoing events to reoccur and thereby overriding the 10-second delay.

Relay 172 and time delay relay 142 are employed to inhibit the recording operation when this is called for. That is, should a train of hot metal cars be transported past the hot metal detecting subsystems in the opposite direction, relay 172 will momentarily energize before relay 170 energizes. This causes time delay relay 142 to energize, and immediately begin the 60-second delay-on-break via its own closed contacts K and M. By virtue of now open contacts C and F of relay 142, time delay relay 140 is prevented from becoming energized, thereby inhibiting initiation of the 115 volt record command.

Stamping of the time and date information during the automatic mode of operation is controlled by contacts K and M of time delay relay 140. Initially, 115 volt line power is applied to the synchronous motor upon activation of the system power switch. When relay 140 energizes as described earlier, the line power is also applied to the printer solenoid, thereby "arming" the stamping mechanism. Ten seconds after the last hot metal car in the train has passed by the inspection station, relay 140 deenergizes. This action removes the line power from the solenoid, causing the stamping mechanism to activate and print out the current time and date information.

The spot detecting system may be operated in a manual mode of operation. Activation of the temperature profile recorder and time/date printer is controlled by contacts manual-automatic switch. When this switch is placed in its manual position, line voltage is applied to the recorder, assuming that sufficient recording paper is available, and to the printer solenoid, thereby arming the stamping mechanism. When this switch is returned to its automatic position, the recorder is deenergized and the stamping operation is performed.

The instant invention has been shown and described herein in what is considered to be the most practical and preferred embodiment. It is recognized, however, that departures may be made from that shown, and described within the scope of the invention.

What we claim is:

1. A spot detecting system for detecting temperature levels of the surface of containers comprising, a control system connected to a power source for controlling said detecting system, said control system including relay logic circuitry for initiating, and stopping the detecting cycle, said relay logic circuitry including a plurality of switches, a triggering means for detecting the presence of a container in an inspection zone and detecting the direction of relative movement between the container and said triggering means, said triggering means connected to said relay logic circuitry for initiating the automatic mode of operation, a scanning means connected to said relay logic circuitry, said scanning means including an optical assembly for scanning narrow areas of the surface of the container, a sensing means connected to said optical assembly for sensing the thermal radiation of the scanned areas of the surface of the container, said sensing means including a sensor for measuring the levels of thermal radiation, an indicating means including a recording means and an alarm means, said recording means including a recorder, and a drive motor connected to said relay logic circuitry for driving said recorder and said optical assembly, said recorder connected to said sensor for recording the levels of sensed thermal radiation, said alarm means connected to said relay logic circuitry for indicating possible breakthroughs in the lining of the container, and said alarm system connected to said sensors for actuating said alarm means.

2. A spot detecting system for detecting temperature levels of the surface of containers moving along a line through the system comprising, a control system connected to a power source for initiating and stopping the detecting cycle, a triggering means connected to the power source for automatically detecting the presence of a container in an inspection zone to actuate said control system, a means for sensing the temperature levels of the surface of the moving container along a line from the entrance end of the container to the exit end of the container, a scanning means connected to said control system for scanning a narrow area of the surface of the container outwardly from said line, and an indicating means connected to said sensing means for indicating possible breakthroughs in the lining of the container.

3. A spot detecting system for detecting temperature levels of the surface of containers comprising, a control system connected to a power source for initiating and stopping the detecting cycle, a triggering means connected to the power source for automatically detecting the presence of a container in an inspection zone to actuate said control system, a means for sensing the temperature levels of the surface of the container, an indicating means connected to said sensing means for indicating possible breakthroughs in the lining of the container, a scanning means connected to said control system for scanning a narrow area of the surface of the container, said scanning means including an optical assembly for scanning a narrow area of the surface of the container, and said scanning means connected adjacent said sensing means whereby said sensing means measures the levels of thermal radiation of the scanned areas of the surface of the container, said control means system includes relay logic circuitry for initiating and stopping the detecting cycle, and said triggering means connected to said relay logic circuitry for actuating the detecting cycle.

4. A spot detecting system for detecting temperature levels of the surface of containers as set forth in claim 3 wherein, said indicating means includes a recording means connected to said relay logic circuitry, and said recording means connected to said sensing means for recording the levels of the sensed thermal radiation.